United States Patent
Vesma et al.

(10) Patent No.: US 7,508,839 B2
(45) Date of Patent: Mar. 24, 2009

(54) ENCAPSULATOR AND AN ASSOCIATED METHOD AND COMPUTER PROGRAM PRODUCT FOR ENCAPSULATING DATA PACKETS

(75) Inventors: Jussi Vesma, Turku (FI); Harri Pekonen, Raisio (FI); András Borsos, Helsinki (FI)

(73) Assignee: Nokia Corporation, Espoo (FI)

( * ) Notice: Subject to any disclaimer, the term of this patent is extended or adjusted under 35 U.S.C. 154(b) by 854 days.

(21) Appl. No.: 10/888,657

(22) Filed: Jul. 9, 2004

(65) Prior Publication Data
US 2006/0007953 A1 Jan. 12, 2006

(51) Int. Cl.
*H04J 3/16* (2006.01)
(52) U.S. Cl. ..................... 370/466; 370/474
(58) Field of Classification Search ............. 370/474
See application file for complete search history.

(56) References Cited

U.S. PATENT DOCUMENTS

| | | | |
|---|---|---|---|
| 2001/0033699 A1* | 10/2001 | Eshraghian | 382/276 |
| 2001/0043358 A1* | 11/2001 | Schwartz | 358/1.15 |
| 2001/0044713 A1* | 11/2001 | Lokhoff et al. | 704/201 |
| 2002/0016933 A1* | 2/2002 | Smith et al. | 714/4 |
| 2002/0105976 A1 | 8/2002 | Kelley et al. | |
| 2003/0152107 A1 | 8/2003 | Pekonen | |
| 2003/0185301 A1* | 10/2003 | Abrams et al. | 375/240.12 |
| 2003/0193962 A1* | 10/2003 | Primrose et al. | 370/411 |
| 2004/0047311 A1 | 3/2004 | Pekonen | |
| 2005/0013274 A1* | 1/2005 | Pekonen et al. | 370/329 |

FOREIGN PATENT DOCUMENTS

WO WO 2004107619 A1 12/2004

OTHER PUBLICATIONS

Final draft ETSI EN 301 192 V1.4.1, Digital Video Broadcasting (DVB); DVB specification for data broadcasting, 78 pages, Jun. 2004.*
DVB Interim Specification, IP Datacast Baseline Specification, 41 pages, Apr. 2004.*
*Digital Video Broadcasting (DVB): Framing structure, channel coding and modulation for digital terrestrial television*; ETSI EN 300 744 V1.4.1 ; Jan. 2001; 49 pages; European Broadcasting Union; European Standard (Telecommunications series).; Digital Video Broadcasting.

(Continued)

*Primary Examiner*—Frank Duong
(74) *Attorney, Agent, or Firm*—Alston & Bird LLP (57) ABSTRACT

A method for encapsulating at least one data packet includes fitting at least one data packet into at least one column of an application data table of an array that also includes a coding data table having at least one column. Then, at least one remaining column of the application data table is filled with padding, and coding data is fit into at least one column of the coding data table of the array. At least one column of coding data is punctured based upon a comparison of a bit rate of incoming data packets and a threshold bit rate, with at least one column of coding data remaining after puncturing the column(s) of coding data. And after puncturing the column(s) of coding data, the data packet(s) in the column(s) of the application data table, and the at least one remaining column of coding data, are encapsulated.

43 Claims, 7 Drawing Sheets

OTHER PUBLICATIONS

*DVB-H outline—AHG DVB* TM-H; DVB-H185r3; Sep. 2003; 36 pages; DVB-Hgeneral.PPT; Digital Video Broadcasting.

*IP Datacast Baseline Specification, PSI/SI Guidelines for IPDC DVB-T/H Systems*; DVB Interim Specification; Apr. 2004; 41 pages; DVB Document A079; Digital Video Broadcasting.

*Digital Video Broadcasting (DVB); DVB specification for data broadcasting*; ETSI EN 301 192 v1.4.1; Jun. 2004; 78 pages; European Standard (Telecommunications series) European Broadcasting Union; Digital Video Broadcasting.

*Digital Video Broadcasting (DVB): Transmission System for Handheld Terminals (DVB-H)*; ETSI EN 302 304 V1.1.1; Jun. 2004; 14 pages; European Standard (Telecommunications series); European Broadcasting Union; Digital Video Broadcasting.

\* cited by examiner

ENCAPSULATOR AND AN ASSOCIATED METHOD AND COMPUTER PROGRAM PRODUCT FOR ENCAPSULATING DATA PACKETS

FIELD OF THE INVENTION

The present invention generally relates to systems and methods for broadcasting content and, more particularly, to systems and methods for encapsulating broadcast content in a manner that reduces the variation of the frame size in encapsulated data streams.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One such delivery technique that has shown promise is Digital Video Broadcasting (DVB). In this regard, DVB-T, which is related to DVB-C (cable) and DVB-S (satellite), is the terrestrial variant of the DVB standard. As is well known, DVB-T is a wireless point-to-multipoint data delivery mechanism developed for digital TV broadcasting, and is based on the MPEG-2 transport stream for the transmission of video and synchronized audio. DVB-T has the capability of efficiently transmitting large amounts of data over a broadcast channel to a high number of users at a lower cost, when compared to data transmission through mobile telecommunication networks using, e.g., 3G systems. Advantageously, DVB-T has also proven to be exceptionally robust in that it provides increased performance in geographic conditions that would normally affect other types of transmissions, such as the rapid changes of reception conditions, and hilly and mountainous terrain. On the other hand, DVB-H (handheld), which is also related to DVB-T, can provide increased performance particularly for wireless data delivery to handheld devices.

Digital broadband data broadcast networks are known. As mentioned, an example of such a network enjoying popularity in Europe and elsewhere world-wide is DVB which, in addition to the delivery of television content, is capable of delivering data, such as Internet Protocol (IP) datagrams. Other examples of broadband data broadcast networks include Japanese Terrestrial Integrated Service Digital Broadcasting (ISDB-T), Digital Audio Broadcasting (DAB), and MBMS, and those networks provided by the Advanced Television Systems Committee (ATSC). In many such systems, a containerization or encapsulation technique, such as a multi-protocol encapsulation (MPE) technique, is utilized to place the IP datagrams into packets which act as data containers. Thus, the containers can be utilized to transport any suitably digitized data including, but not limited to High Definition TV, multiple channel Standard definition TV (PAUNTSC or SECAM) and, of course, broadband multimedia data and interactive services.

In accordance with broadband data broadcasting techniques such as DVB-H, a channel coding technique such as forward error correction (FEC) (e.g., Reed-Solomon coding) technique can be used to correct transmission errors in the receivers. In this regard, before encapsulating the IP datagrams, channel coding techniques may add some redundancy (parity bits) to the IP datagrams in accordance with, the parity bits being thereafter used in the receivers to correct errors. As will be appreciated, however, coding alone is typically not sufficient in a fading mobile channel. As such, to spread any error bursts before decoding in the receiver, the IP datagrams can be coded and encapsulated in accordance with an interleaving/de-interleaving technique. For an example of such a technique, see U.S. patent application Ser. No. 10/382,334, entitled: System and Method for Data Transmission and Reception, filed Mar. 5, 2003, the contents of which are hereby incorporated by reference in its entirety. More particularly, before encapsulating the IP datagrams, the IP datagrams or a copy of the IP datagrams can be fit column-wise or row-wise into an application data table until the next IP datagram cannot fully fit into the application data table or until reaching the cycle time for the service including the IP datagrams. Thereafter, one or more partial or full columns or rows of zero padding can be added after the last full IP datagram to the end of the application data table.

Thereafter, coding such as Reed-Solomon (RS) can be calculated row-wise for each row of the application data table including column-wise IP datagrams, with the resulting RS parity bytes added to a corresponding row in a coding (e.g., RS) data table associated with the application data table. In such instances, the RS parity bytes of each row can themselves form a number of columns of RS data. Alternatively, for an application data table including row-wise IP datagrams, RS coding can be calculated column-wise for each column of the application data table, with the resulting RS parity bytes added to a corresponding column of the RS data table such that the RS parity bytes of each column can form a number of rows of RS data. In either event, however, the resulting application data table and coding data table can then be referred to as an MPE-FEC array or frame.

After filling in the application and coding data tables, the IP datagrams can be read out of the application data table in a column-wise or row-wise manner and encapsulated into MPE sections. Alternatively, if the application data table is filled with copies of the IP datagrams, the original IP datagrams can be encapsulated into MPE sections without waiting for the application data table being filled. In either event, however, the zero padding is typically not read out and encapsulated. The RS data can also be read out of the RS data table in a column-wise or row-wise manner, and encapsulated into MPE-FEC sections. Each section, then, can include an IP datagram or RS data, and also include a header including real-time parameters (e.g., section-specific parameters), and a trailer including a cyclic redundancy check (e.g., CRC-32). The resulting MPE and MPE-FEC sections can be referred to as an MPE section stream.

After encoding and encapsulating the IP datagrams, the resulting MPE section stream can be modulated and broadcast to one or more terminals. In accordance with broadcasting techniques such as DVB-H, however, before the MPE section stream is modulated, the MPE section stream can be time sliced with MPE section streams of a number services broadcast in a number of channels. In this regard, the MPE section streams for a number of services broadcast in a number of channels can be time-sliced into channel bursts before broadcasting to the receivers to thereby permit the receivers to only remain active for a fragment of the time. Time-slicing therefore results in considerable power saving, and makes it possible for the receivers to monitor neighboring cells for handover.

Whereas broadcasting techniques such as that described above are adequate to broadcast content in a broadband data broadcasting network, such broadcasting techniques have drawbacks. Conventionally, the maximum size of an MPE-FEC frame is fixed for one service, and the transmission capacity is reserved for this maximum frame size. However, the bit rate of streaming data is not typically constant. As such, because the capacity is reserved for the full frame, MPE-FEC frames typically include an amount of padding/unused capacity for that portion of the MPE-FEC frame that is not filled with IP datagrams. Even in such an instance, however, if the maximum size of the MPE-FEC frame is too small, the content that does not fit into the frame may be deleted.

When the maximum MPE-FEC frame size for a service is fixed and the bit rate of incoming data varies, it may be the case that the number of columns in the application data table is not filled with content, but is instead filled with padding. As the padded columns are not encoded and broadcast, the used bandwidth is less than that reserved for a full-size frame, and thus, bandwidth is wasted. On the other hand, if the bit rate of the incoming data is high enough, it may be the case that all of the incoming content cannot be placed into the frame, and are consequently discarded. Thus, it would be desirable to design a system and method of broadcasting content in a manner that reduces the frame size variation of encapsulated data streams to thereby maximize the used bandwidth, while reducing the amount of content discarded as not fitting within a current MPE-FEC frame, and thus the encapsulated data stream.

SUMMARY OF THE INVENTION

In light of the foregoing background, embodiments of the present invention provide an improved encapsulator and associated method and computer program product for encapsulating data packets. In accordance with embodiments of the present invention, the encapsulator, method and computer program product are capable of reducing variation in the size of an array, such as an MPE-FEC frame, that includes an application data table part and a coding data table part. By reducing variation in the size of the frame, then, embodiments of the present invention can reduce variation in the subsequent encapsulated data stream. As explained below, embodiments of the present invention can reduce variation in the size of a frame in any of a number of different manners. For example, embodiments of the present invention can reduce variation in the size of a frame by varying the number of columns of coding data in the data table based upon the data rate (i.e., bit rate of streaming data), or otherwise based upon the number of data packets being broadcast within a given channel burst.

According to one aspect of the present invention, a method is provided for encapsulating at least one data packet, such as by an encapsulator. The method includes fitting at least one data packet into at least one column of an array. The array includes an application data table part and a coding data table part, with each table including at least one column and at least one row. As such, the data packet(s) are fit into at least one column of the application data table of the array. Then, at least one remaining column of the application data table is filled with padding. Coding data is fit row-wise into the coding data table of the array, the coding data having been calculated row-wise from corresponding rows of the application data table. Once the array is filled, at least one column of coding data is punctured based upon predefined criteria. And after puncturing the column(s) of coding data, the data packet(s) in the column(s) of the application data table, and any remaining column of coding data in the coding data table, are encapsulated.

More particularly, at least one column of coding data can be punctured based upon a comparison of a number of columns of padding with a threshold number of columns of padding, where the comparison of columns is representative of a comparison of a bit rate of incoming data packets and a threshold bit rate. In one instance, for example, the coding data table includes at least one base column and at least one spare column. In such an instance, at least one column of coding data can be punctured by comparing the number of columns of padding and the threshold number of columns of padding, and thereafter puncturing all of the spare columns of coding data when the number of columns of padding equals the threshold number of columns.

Alternatively, all of the spare column(s) and at least one of the base column(s) of coding data can be punctured when the number of columns of padding is less than the threshold number of columns. In this regard, the number of base column(s) punctured can equal the difference between the number of columns of padding and the threshold number of columns of padding. In another alternative, less than all of the spare column(s) of coding data can be punctured when the number of columns of padding is greater than the threshold number of columns. In such an instance, the number of spare column(s) punctured can equal all of the spare column(s) less a number of spare column(s) equal the difference between the number of columns of padding and the threshold number of columns of padding.

The number of punctured columns of coding data can additionally or alternatively be determined based upon a predefined quality-of-service (QoS) level and a number of the column(s) of padding, where the QoS level is representative of a relative error capability, such as of a receiver. The determined number of columns of coding data can then be punctured. The method for encapsulating data packet(s) can then continue for other data packet(s) in the same manner, with the encapsulated data packets and remaining column(s) of coding data thereafter broadcast, such as to one or more terminals. In this regard, a measure of a reception quality of the encapsulated data packet(s) and the remaining column(s) of coding data, such as a number of reception errors, can be received. Then, the predefined QoS level can be adjusted based upon the measure of the reception quality. More particularly, for example, the predefined QoS level can be increased if the measure of the reception quality is below a threshold acceptable level of quality. In this regard, the measure of the reception quality can be compared with a reception quality associated with the predefined QoS level. Then, if based upon the comparison, the measure of the reception quality is below the reception quality associated with the predefined QoS level, the QoS level can be increased to a level associated with a reception quality at least as high as the threshold acceptable level of quality.

According to other aspects of the present invention, a system, encapsulator and computer program product are provided for encapsulating data packets. Therefore, embodiments of the present invention provide an improved system, encapsulator, method and computer program product for encapsulating data packets. Embodiments of the present invention can reduce variation in the size of an array by forming or otherwise configuring the array to include a coding data table with a number of spare columns of coding data and a number of base columns of coding data. For a data rate that is equal to a predefined threshold bit rate, then, the encapsulator can puncture the spare columns of coding data after filling the coding data table. Then, for a data rate above the predefined threshold, the encapsulator can puncture the spare coding columns, as well as one or more base columns of coding data. And for a data rate below the predefined threshold, the encapsulator can puncture only a portion, if any, of the spare coding columns, thereby encapsulating and subsequently broadcasting more coding data. Additionally or alternatively, the encapsulator can determine a number of columns of coding data to puncture based upon a predefined QoS level. Therefore, the encapsulator and associated method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
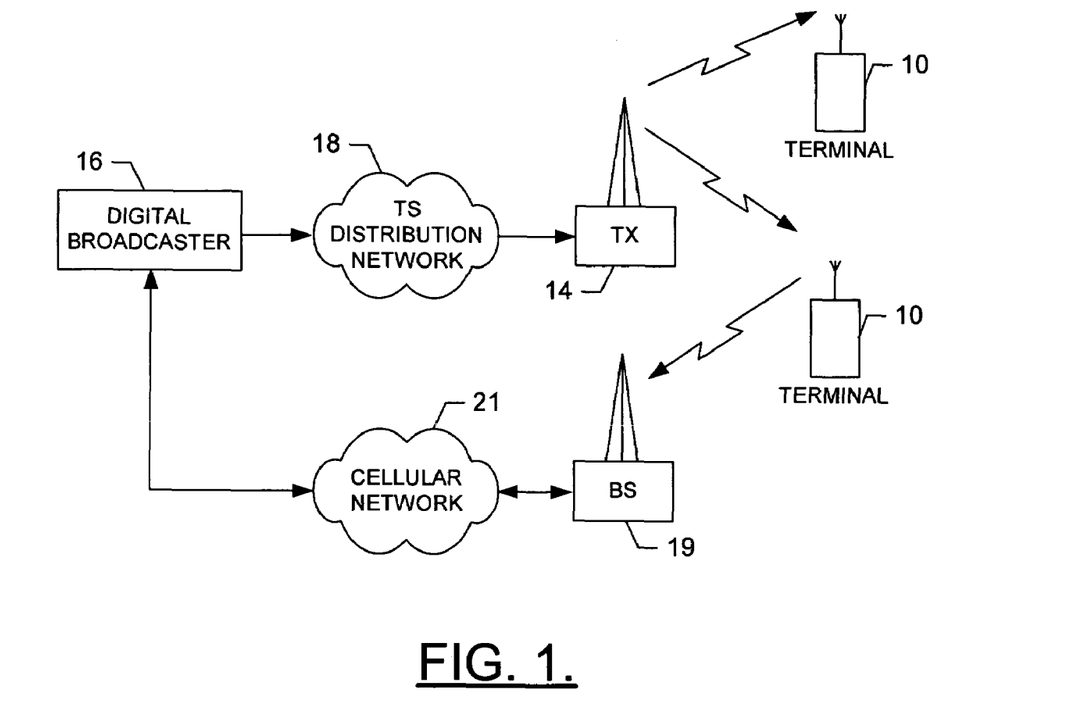
FIG. 1 is a schematic block diagram of a digital broadcast system in accordance with one embodiment of the present invention.

Referring to FIG. 1, an illustration of one type of terminal and system that would benefit from the present invention is provided. The system, method and computer program product of embodiments of the present invention will be primarily described in conjunction with mobile communications applications. More particularly, system, method and computer program product of embodiments of the present invention will be primarily described in conjunction with digital broadcast networks including, for example, DVB-T, DVB-C, DVB-S, DVB-H, DMB-T, ISDB-T, DAB, MBMS, BCMCS, ATSC networks, or the like. It should be understood, however, that the system, method and computer program product of embodiments of the present invention can be utilized in conjunction with a variety of other applications, both in the mobile communications industries (both in the digital broadcast network industries and outside the digital broadcast network industries) and outside of the mobile communications industries.

As shown, the system can include a plurality of terminals 10 (two being illustrated), each of which may include an antenna for receiving signals from one or more transmitters (TXs) 14 (one being illustrated). Each terminal can comprise any of a number of different wireless communication devices including, for example, a mobile telephone, portable digital assistant (PDA), pager, laptop computer, broadband (e.g., DVB-T, DVB-H, etc.) receiving device, and other types of voice, text and multimedia communications systems. The transmitters can be coupled to a digital broadcaster service provider, such as a digital broadcaster 16, via a transport stream (TS) distribution network 18. The TS distribution network can comprise any of a number of wireline and/or wireless networks for distributing content to the transmitters. For example, the TS distribution network can comprise a wireline network such as a fiber optic network (e.g., OC-3 network), and/or a wireless network such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content from the digital broadcaster, such as content for one or more television, radio and/or data channels.

As shown, one or more of the terminals 10 may also be capable of transmitting signals to and for receiving signals from a base site or base station (BS) 19. The base station is a part of a cellular network 21 that includes elements required to operate the network, and that can also be coupled to the digital broadcaster 16 (explained below). In this regard, the terminal can be capable of receiving content from any of a number of different entities in any one or more of a different number of manners. In one embodiment, for example, the terminal can be capable of receiving data, content or the like in accordance with one or more DVB (e.g., DVB-T, DVB-H, etc.) techniques as well as one or more cellular (e.g., 1G, 2G, 2.5G, 3G, etc.) communication techniques. For more information on such a terminal, see U.S. patent application Ser. No. 09/894,532, entitled: Receiver, filed Jun. 29, 2001, the contents of which is incorporated herein by reference in its entirety.

Figure 2:
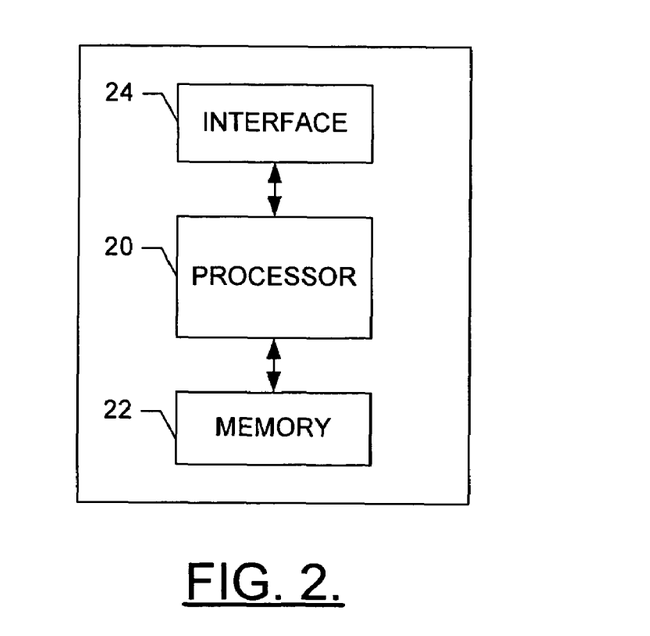
FIG. 2 is a schematic block diagram of an entity capable of operating as a terminal, transmitter, base station and/or digital broadcaster, in accordance with embodiments of the present invention.

Referring now to FIG. 2, a block diagram of an entity capable of operating as a terminal 10, transmitter 14, base station 19 and/or digital broadcaster 16 is shown in accordance with one embodiment of the present invention. As shown, the entity can generally include a processor 20 connected to a memory 22. The processor can also be connected to at least one interface 24 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

Figure 3:
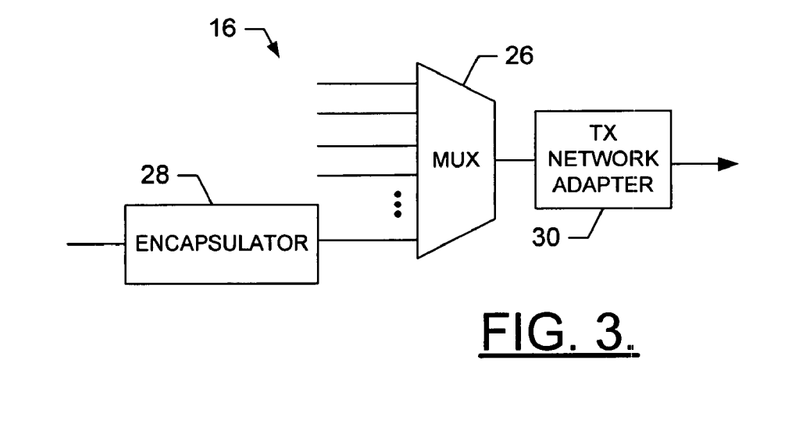
FIG. 3 is a functional block diagram of a digital broadcaster, in accordance with one embodiment of the present invention.

Reference is now made to FIG. 3, which illustrates a functional block diagram of a digital broadcaster 16 of one embodiment of the present invention. The digital broadcaster can include a multiplexer 26, which can be capable of multiplexing content for a number of television, radio and/or data channels. More particularly, for example, data streams including IP datagrams for a number of IP services can be supplied from several service providers. One or more of the data streams can be encapsulated by one or more IP encapsulators 28 (one being illustrated), each of which can be integrated with digital broadcaster (as shown) or distributed from the digital broadcaster. The IP encapsulator, in turn, can feed the encapsulated IP data streams to the multiplexer, where the encapsulated IP data streams can be multiplexed with other IP data streams, and/or content for one or more television, radio and/or data channels.

Figure 4:
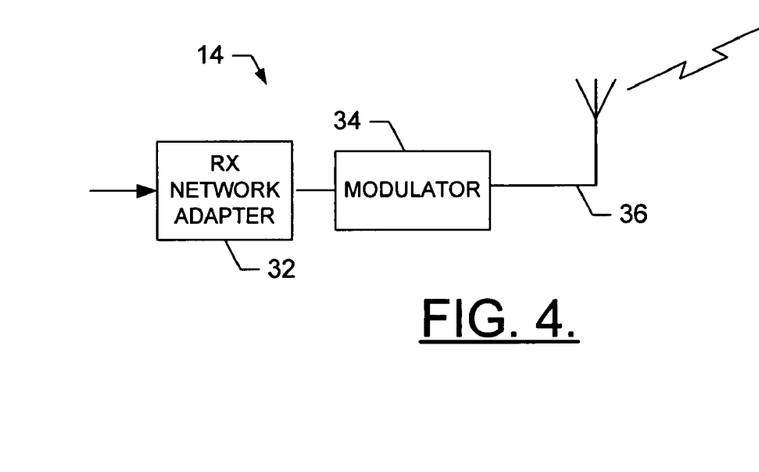
FIG. 4 is a functional block diagram of a transmitter, in accordance with one embodiment of the present invention.

After multiplexing the content, the multiplexer 26 can then feed the resulting transport stream (TS), such as an MPEG-2 TS, to a transmitter (TX) network adapter 30, which is capable of providing the transport link to send the transport stream across the TS distribution network 18 to one or more transmitters 14. Referring to FIG. 4, a functional block diagram of a transmitter of one embodiment of the present invention is shown. As illustrated, the transmitter can include a receiver (RX) network adapter 32 capable of providing the transport link along with the TX adapter to receive the transport stream from the TS distribution network. The RX network adapter can then provide the transport stream to a modulator 34, which is capable of modulating the transmission stream, such as in accordance with DVB-T, DVB-H or the like. The modulated transmission stream can then be broadcast to one or more terminals 10, such as via an antenna 36. For information on DVB-T, see ETSI European Standard EN 300 744, entitled: Digital Video Broadcasting (DVB): Framing Structure, Channel Coding and Modulation for Digital Terrestrial Television, v.1.4.1 (2001) and related specifications, the contents of which are hereby incorporated by reference in their entirety. And for more information on DVB-H, see ETSI EN 302 304, entitled: Digital Video Broadcasting (DVB): Transmission System for Handheld Terminals, v.1.1.1 (2004) and related specifications, the contents of which are hereby incorporated by reference in their entirety.

Figure 5:
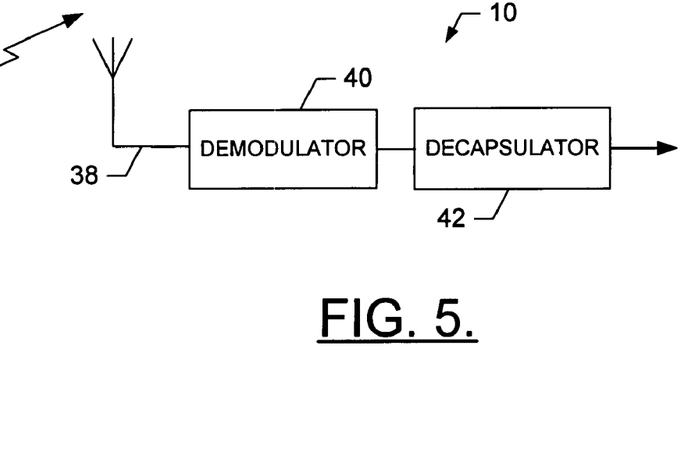
FIG. 5 is a functional block diagram of a terminal, in accordance with one embodiment of the present invention.

Referring to the block diagram of a terminal 10 shown in FIG. 5, the terminal can receive the modulated transmission stream from the transmitter 14, such as via an antenna 38. Thereafter, the modulated transmission stream can be provided to a demodulator 40 capable of demodulating the modulated transmission stream, such as in accordance with the same technique (e.g., DVB-T/H) used to modulate the transmission stream. The demodulated transmission stream can then be fed into a decapsulator 42, which can be capable of decapsulating the transmission stream into a number of IP datagrams, such as in the opposite manner as the encapsulator 28 encapsulated the IP datagrams. The IP datagrams can then be fed to the remainder of the terminal (not shown), such as for use by the terminal.

Figure 6:
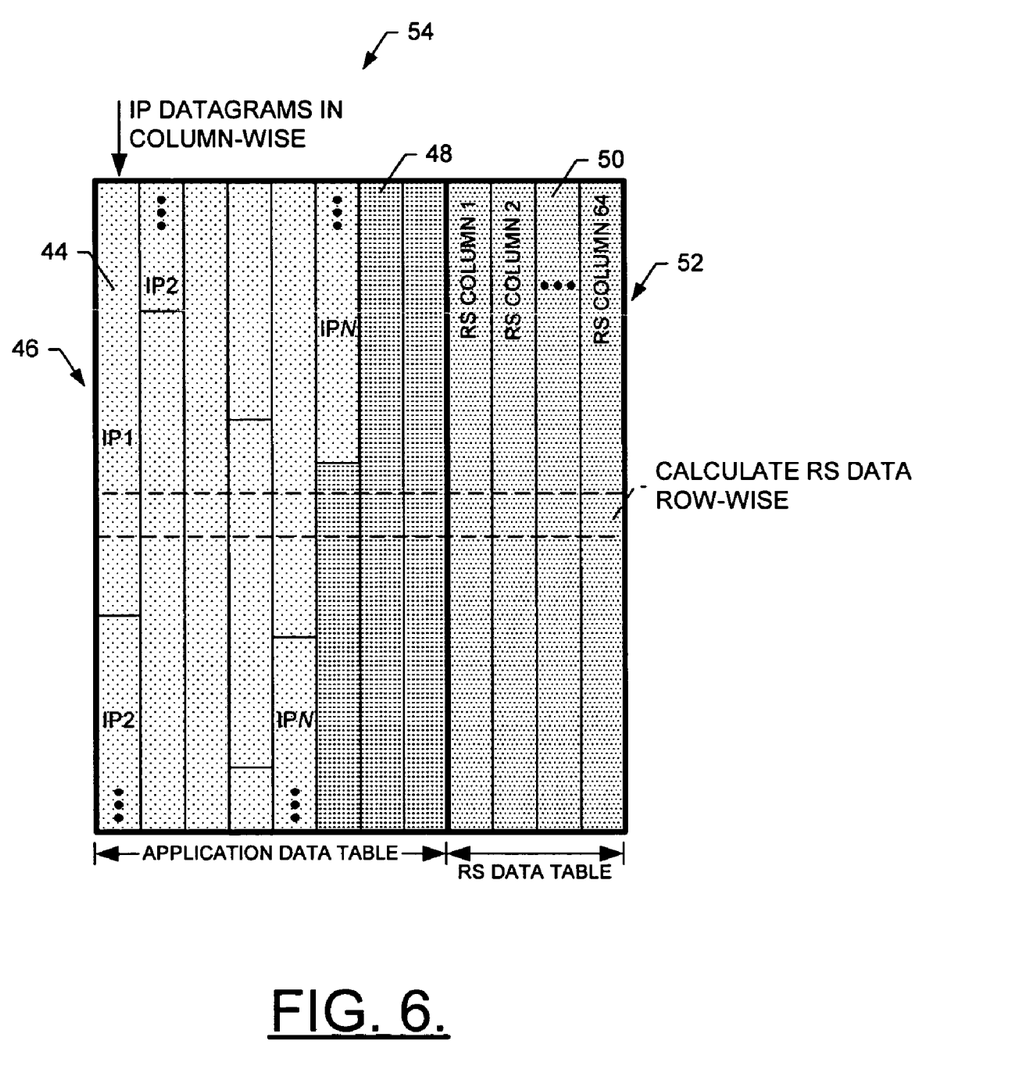
FIG. 6 is a schematic block diagram of an MPE-FEC frame, in accordance with one embodiment of the present invention.

Referring again to FIG. 3, in accordance with broadband data broadcasting techniques such as DVB-T/H, the encapsulator 28 of the digital broadcaster 16 can be capable of receiving IP datagrams 44 for one or more IP services, and thereafter coding and encapsulating the IP datagrams in accordance with an interleaving/de-interleaving technique. More particularly, the encapsulator can be capable of coding the IP datagrams in accordance with a forward error correction (FEC) technique using, for example, Reed-Solomon coding (e.g., RS(255, 191, 64)). To code the IP datagrams, the encapsulator can fit the IP datagrams column-wise into an application data table 46, where the application data table includes a number of columns and rows and each element (column-row pair) of the table holding a portion (e.g., one byte) of the datagram. Thereafter, the encapsulator can fill any remaining full or partial column of the application data table with one or more full or partial zero padding columns 48, as shown in FIG. 6.

Coding data such as Reed-Solomon (RS) data 50 can then be calculated row-wise for each row of the application data table 46, with the resulting RS parity bytes added to a corresponding row in a coding (e.g., RS) data table 52 associated with the application data table. The row-wise RS parity bytes of each row can themselves form a number of columns of RS data, as also shown in FIG. 6. As described herein, the application data table can include column-wise IP datagrams 44 and zero padding 48, with the RS data calculated row-wise and added to a corresponding row of the RS data table. It should be understood, however, that the application data table can alternatively be filled row-wise with IP datagrams and zero padding. And in such instances, the RS coding data can be calculated column-wise for each column of the application data table, with the resulting RS parity bytes added to a corresponding column of the RS data table such that he RS parity bytes of each column can form a number of rows of RS data. In either event, however, the resulting application data table and coding data table can then be referred to as an array or frame, such as an MPE-FEC frame 54.

As will be appreciated by those skilled in the art, coding of the IP datagrams 44 can be made stronger or weaker by reducing or increasing the code rate, respectively. In turn, the code rate can be reduced or increased by varying the number of columns of zero padding 48 and/or the number of columns of RS data 50 punctured. The code rate (CR) can be given by the expression, $CR = k/n$, where k represents the number of information bytes in a row of the application data table, and n represents the total number of bytes per row of the MPE-FEC frame (for n−k parity bytes of RS data per row). In accordance with DVB, for example, the typical code rate is ¾ (i.e., (191) information bytes divided by (255) total bytes per row). Other typical code rates include ½ (127 padding columns), ⅔ (63 padding columns) and ⅚ (26 padding columns). Thus, with the number of bytes per row (n) remaining constant, the code rate (CR) can be reduced by reducing the number of information bytes (k), or can be increased by increasing the number of information bytes (thus decreasing the number of parity bytes (n−k)).

Figure 7A:
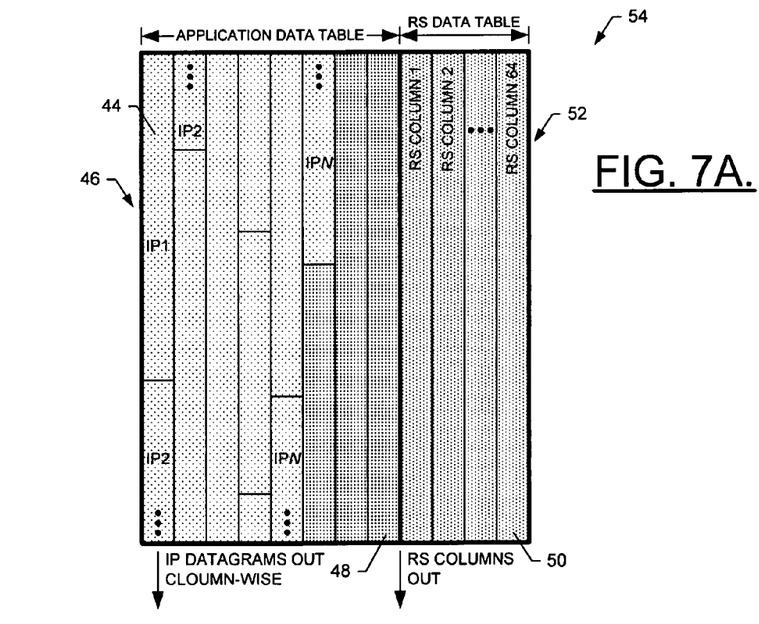
FIGS. 7A and 7B illustrate schematic block diagrams of an MPE-FEC frame and encapsulated MPE and MPE-FEC sections, respectively, during coding and encapsulation of IP datagrams in accordance with one embodiment of the present invention.
Figure 7B:
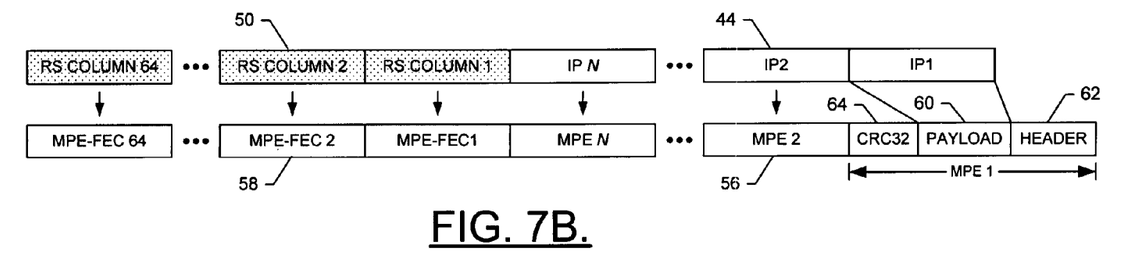

After filling in the application and RS data tables 46, 52, the encapsulator 28 can encapsulate the IP datagrams 44 and the RS data 50 in the application and RS data tables. For example, after filling out the application and RS data tables, the encapsulator can read out the IP datagrams from the application data table in a column-wise manner, and encapsulate the IP datagrams into MPE sections 56, as shown in FIGS. 7A and 7B. Similarly, the RS data can also be read out of the RS data table in a column-wise manner, and encapsulated into MPE-FEC sections 58. The zero padding 46 from the application data table, however, is not read out and encapsulated.

Each MPE and MPE-FEC section 56, 58 can include payload 60 having an IP datagram 44 or RS data 50, and can also include a header 62 including real-time parameters (e.g., section-specific parameters), and a trailer including a cyclic redundancy check (e.g., CRC-32) 64. The real-time parameters can include, for example, an address defining the position of a respective IP datagram or RS data in the MPE-FEC frame, a table boundary flag that indicates the end of the application or RS data table. Also, the real-time parameters can include, for example, a frame boundary flag that indicates the end of the MPE-FEC frame, and a padding parameter that indicates the number of full padding columns in the application data table. The resulting MPE and MPE-FEC sections can be referred to as an MPE section stream. For more information on MPE technique for encapsulating datagrams, see ETSI EN 301 192, entitled: Digital Video Broadcasting (DVB): DVB Specification for Data Broadcasting, v.1.4.1 (2004) and related specifications, the contents of which are hereby incorporated by reference in their entirety.

Figure 8A:
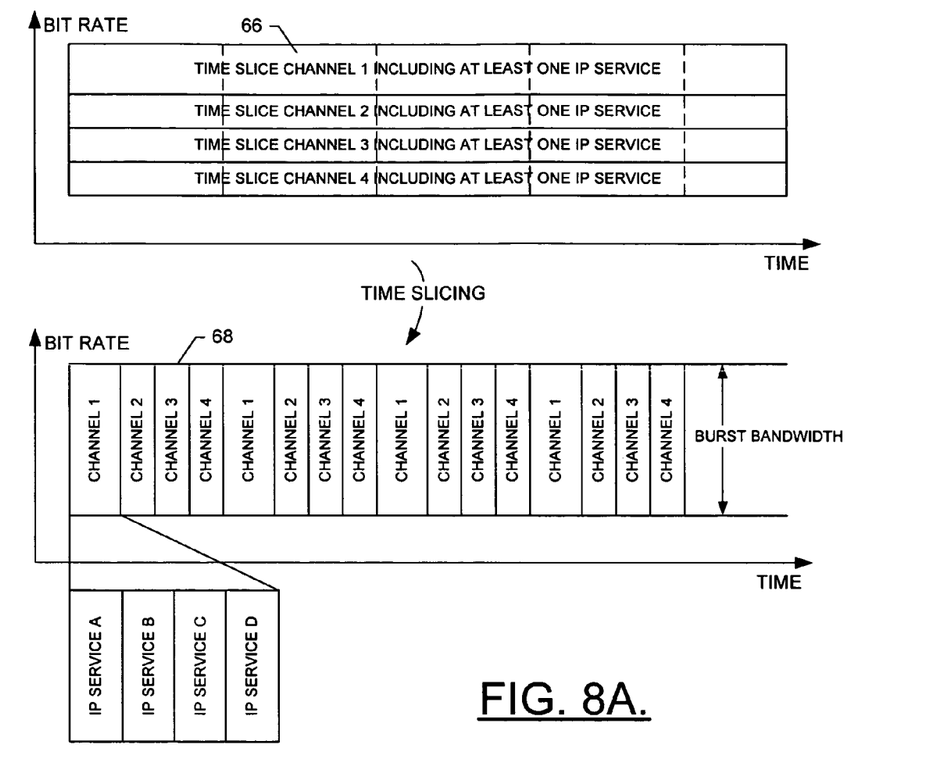
FIGS. 8A and 8B are schematic block diagrams illustrating time-slicing of encapsulated IP data streams into channel bursts and parameters associated with those bursts, respectively, in accordance with embodiments of the present invention.
Figure 8B:
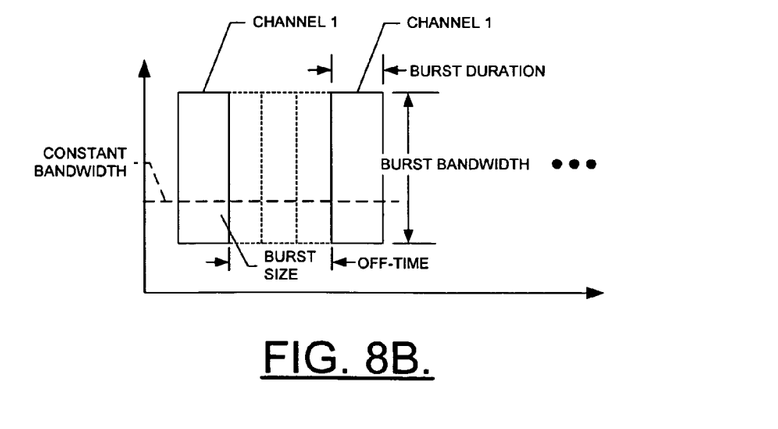

After encapsulating the IP datagrams 44 and RS data 50, the encapsulator 28 can feed the encapsulated IP data streams (i.e., MPE and MPE-FEC sections 56, 58), along with program specific information (PSI) tables and service information (SI) tables, to the multiplexer 26 of the data broadcaster 16. The encapsulated IP data streams and PSI/SI tables can then be multiplexed with other IP data streams, and/or content for one or more television, radio and/or data channels, and subsequently broadcast of the multiplexed IP data streams to one or more terminals 10. Before feeding the encapsulated IP data streams and PSI/SI tables to the multiplexer, however, the encapsulator can be capable of time-slicing the encapsulated IP data streams for one or more channels (e.g., channels 1, 2, 3 and 4) that each include one or more services (e.g., services A, B, C and D), such as in accordance with DVB-H, as shown in FIG. 8A. As shown in FIG. 8A, then, the encapsulator 28 can map the encapsulated IP data streams 66 into a number of channel bursts 68. As shown in FIG. 8B, each channel burst can have an associated burst duration and an off time, the aggregate of which is typically referred to as the cycle time for the respective channel burst. In addition each channel burst can have a burst size and a burst bandwidth in relation to a constant bandwidth of the transmission stream.

Irrespective of whether the encapsulated IP data streams 66 are time-sliced into channel bursts 68, the encapsulated IP data streams and PSI/SI tables can fed into the multiplexer 26 of the digital broadcaster 16 for multiplexing with other IP data streams, and/or content for one or more television, radio and/or data channels. As indicated above, the multiplexer can then feed the resulting transport stream (TS), such as an MPEG-2TS, to a TX network adapter 30, and from the transmitter network adapter to the RX network adapter of one or more transmitters 14. The RX network adapter can then provide the transport stream to a modulator 34 capable of modulating the transmission stream, such as in accordance with DVB-T, DVB-H or the like. The modulated transmission stream can then be broadcast to one or more terminals 10, such as via an antenna 36.

As explained in the background section, the maximum size of an MPE-FEC frame 54 is conventionally fixed for one service and the transmission capacity is reserved for this maximum frame size. However, the bit rate of streaming data is not typically constant. As such, the MPE-FEC frame is not usually completely filled with IP datagrams, but instead may include zero padding. In this regard, the MPE-FEC frame typically includes headroom to account for variations in the IP datagrams since, if the maximum size of the MPE-FEC frame is too small, any IP datagrams that do not fit into the frame may be deleted. But if the MPE-FEC frame is too large, the used bandwidth is less than reserved for a full-size frame, and as such, bandwidth may be wasted when the encapsulated data stream is broadcast. Thus, in accordance with embodiments of the present invention, the digital broadcaster 16, or more typically the encapsulator 28 of the digital broadcaster, is capable of reducing variation in the MPE-FEC frame size, and thus reducing variation in the subsequent encapsulated data stream.

The encapsulator 28 of the digital broadcaster 16 can be capable of reducing variation in the size of an MPE-FEC frame 54 in any of a number of different manners. In one typical embodiment explained below, the encapsulator is capable of reducing variation in the size of the MPE-FEC frame by varying the number of columns of RS data 50 in the RS data table 52 based upon predefined criteria, such as the data rate (i.e., bit rate of streaming data), or otherwise based upon the number of IP datagrams 44 being broadcast within a given channel burst. In this regard, the encapsulator can form the MPE-FEC frame to include an RS data table with a number of base columns of RS data and a number of spare columns of RS data. For a data rate that is equal to a predefined threshold bit rate, the encapsulator can puncture or otherwise delete all of the spare RS columns of RS data after filling the RS data table. Then, for a data rate above the predefined threshold, the encapsulator can puncture the spare RS columns, as well as one or more additional columns of RS data. And for a data rate below the predefined threshold, the encapsulator can puncture fewer than all of the spare RS columns, thereby encapsulating and subsequently broadcasting additional RS data.

Figure 9:
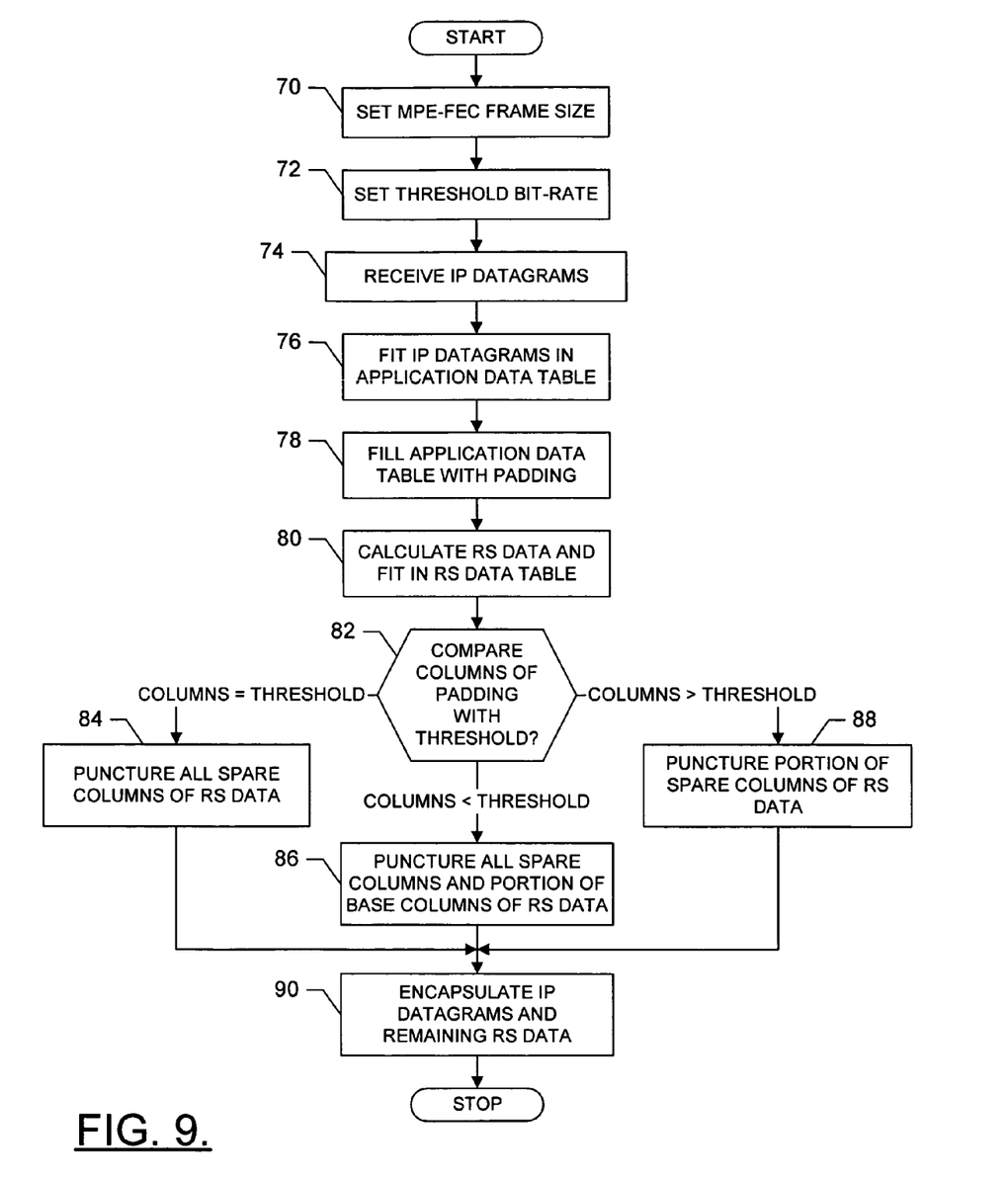
FIG. 9 is a flowchart illustrating various steps in a method of encapsulating content, in accordance with one embodiment of the present invention.

Reference is now made to FIGS. 9 and 10A, 10B, 10C and 10D. FIG. 9 illustrates a flowchart including various steps in a method of encapsulating content, such as IP datagrams, in accordance with one embodiment of the present invention. FIGS. 10A, 10B, 10C and 10D, on the other hand, illustrate schematic block diagrams of MPE-FEC frames configured and thereafter filled in accordance with embodiments of the present invention. As shown in block 70 of FIG. 9, a method of encapsulating content can include the data broadcaster 16, or more typically the encapsulator 28 of the data broadcaster, setting or otherwise receiving a size of a frame, such as an MPE-FEC frame 54. In this regard, the frame can be set for coding a number of data packet (e.g., IP datagrams), where the frame includes an application data table and a coding (e.g., RS) data table. The size can be set in any of a number of different manners. For example, the size can be set based upon a number of parameters associated with the data packets coded based upon the frame. More particularly, for example, in accordance with DVB, the size can be set based upon the coded data packets, and parameters associated with time-slicing of those packets. More particularly, the size can be set based upon the maximum average bit rate in the MPE section payload level over one time-slicing cycle. In this regard, the maximum average bit rate can be determined based upon the burst size and cycle time, where the cycle time can be based upon the burst duration and off time. The burst duration, in turn, can be based upon the burst size and the burst bandwidth, and the off time can be cased upon the burst size, constant bandwidth and burst duration. For more information on such parameters, see section 9.2 of ETSI EN 301 192.

Before, after or as the size of the MPE-FEC frame 54 is set, the data broadcaster 16 or more typically the encapsulator 28 of the data broadcaster, can set or otherwise receive a threshold bit rate of receiving content, such as IP datagrams, at the encapsulator, as shown in block 72. The threshold can be set in any of a number of different manners. In one typical embodiment, for example, the threshold is set to correspond to a typical bit rate of receiving content at the encapsulator. In such instances, the typical bit rate can be set in any of a number of different manners, such as based upon historical data, statistical analysis or the like.

Figure 10A:
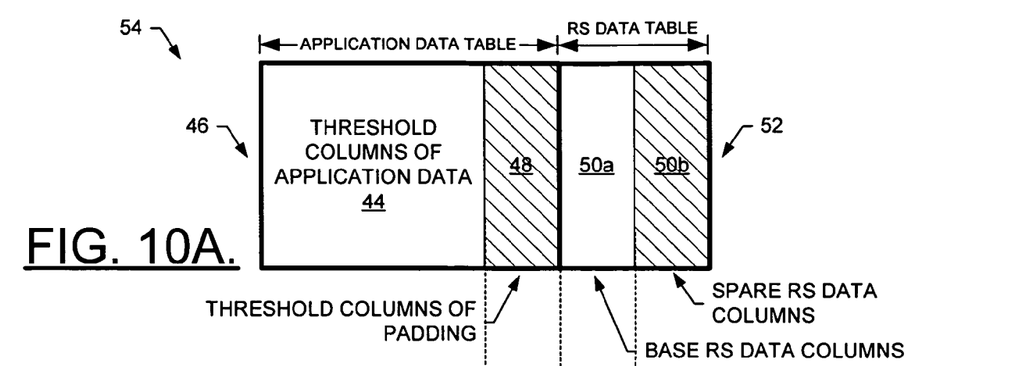
FIGS. 10A, 10B, 10C and 10D are schematic block diagrams of MPE-FEC frames configured and thereafter filled in accordance with embodiments of the present invention.

As shown in FIG. 10A, then, by setting the size of the MPE-FEC frame 54 and the threshold bit rate, the application data table 46 of the frame can be configured to include, for IP datagrams received at the threshold bit rate, a threshold number of columns of application data 44 as well as a threshold number of columns of padding data 48. Similarly, the RS data table 52 can be configured to include, for the threshold bit rate, a number of RS data columns 50. The RS data columns, then, can include a number of base columns of RS data 50a that are subsequently encapsulated and sent with the encapsulated IP datagrams, and a number of spare columns of RS data 50b that are subsequently punctured before encapsulating the RS data and are therefore not encapsulated and sent with the encapsulated IP datagrams. And as the number of RS data columns can be determined based upon the particular RS coding scheme, the number of spare columns of RS data can correspond to the threshold number of columns of padding data. In accordance with DVB-H, for example, the RS data table can include 64 columns of RS data, with the 64 columns comprising a number of base columns and a number of spare columns.

After setting the size of the MPE-FEC frame 54 and the threshold bit rate, the encapsulator 28 can receive at least one, but more typically a plurality, of IP datagrams, as shown in block 74. As the encapsulator receives the IP datagrams, the encapsulator can code and encapsulate the IP datagrams in accordance with an interleaving/de-interleaving technique. More particularly, the encapsulator can fit the received IP datagrams, or copies of the received IP datagrams, columnwise into an application data table 46 of an MPE-FEC frame, as shown in block 76. The encapsulator can continue to fill the application data table until the next IP datagram cannot fully fit into the application data table, or until a delta-t time is reached. In this regard, as defined in ETSI EN 301 192, the delta-t time can be defined as the channel burst cycle time for the corresponding time-sliced channel burst.

After filling the application data table 46, a portion of the application data table may remain unfilled with IP datagrams. Thus, one or more columns of the application data table may be filled with zero padding 48 to fill the remaining portion of the application data table, as shown in block 78. Next, coding data such as RS data 50 can be calculated for each row of the application data table, with the resulting RS data added to, or otherwise fit into, a corresponding row in the coding (e.g., RS) data table 52 associated with the application data table of the MPE-FEC frame, with the RS parity bytes of each row forming a number of columns of RS data, as shown in block 80. Then, after filling in the application and RS data tables 46, 52, the encapsulator 28 can encapsulate the IP datagrams 44 and the RS data 50 in the application and RS data tables.

Before encapsulating the IP datagrams 44 and the RS data 50 in the application and RS data tables 46, 52, however, the encapsulator 28 can puncture or otherwise withhold sending/transmitting one or more columns of RS data 50 from the RS data table. The number of columns of RS data punctured can be determined in any of a number of different manners, such as based upon predefined criteria. In one typical embodiment, for example, the number of columns of RS data punctured is determined based upon a comparison of the bit rate of incoming IP datagrams to the encapsulator and the threshold bit rate. As will be appreciated, as the bit rate of incoming IP datagrams at the encapsulator increases, the number of IP datagrams that are fit into the application data table of an MPE-FEC frame typically increases, thus decreasing the number of columns of padding 48. Likewise, as the bit rate of incoming IP datagrams at the encapsulator decreases, the number of IP datagrams that are fit into the application data table typically decreases, thus increasing the number of columns of padding. Thus, the number of columns of RS data punctured can be determined based upon a comparison of the number of columns of padding in the application data table with the threshold number of padding columns.

Figure 10B:
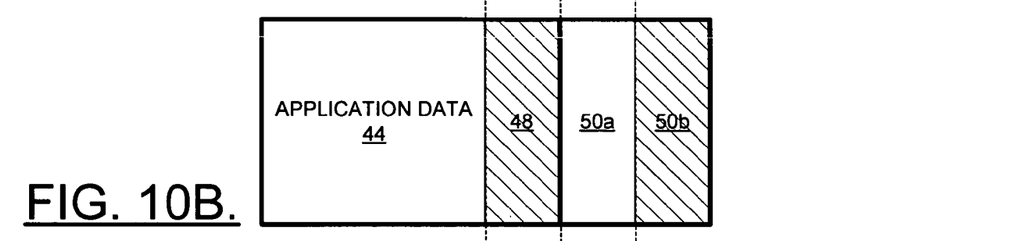
Figure 10C:
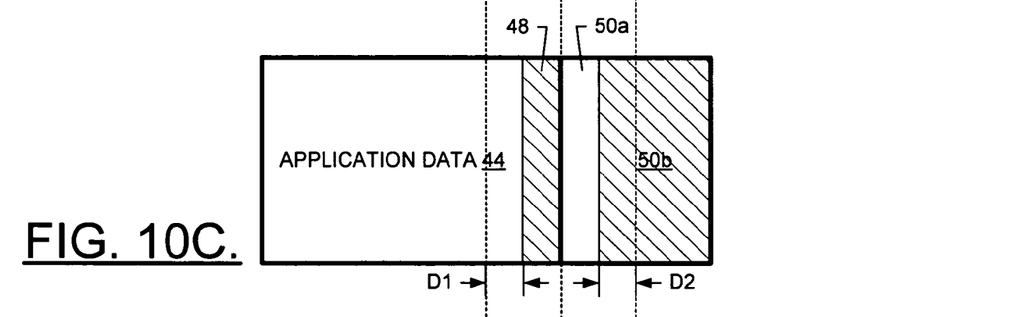

More particularly, the encapsulator 28 can compare the number of columns of padding in the application data table with the threshold number of columns, as shown in block 82. As shown in FIG. 10B and block 84 of FIG. 9, if the number of columns of padding equals the threshold number of columns of padding, thereby indicating the bit rate of incoming IP datagrams equals the threshold bit rate (e.g., typical bit rate), the encapsulator can be capable of puncturing the spare columns of RS data 50b, thereby leaving the base columns of RS data 50a for encapsulation. On the other hand, if the number of columns of padding is less than the threshold number of columns of padding, thereby indicating the bit rate of incoming IP datagrams is above the threshold bit rate (e.g., typical bit rate), the encapsulator can be capable of puncturing the spare columns of RS data 50b as well as one or more base columns of RS data, as illustrated in FIG. 10C and block 86 of FIG. 9. Then, only a portion of the base columns of RS data are left for encapsulation. As shown in FIG. 10C, for example, the number of columns of padding may be less than the threshold number of columns by an amount represented by D1. In such an instance, the encapsulator can puncture the spare columns of RS data by an amount D2. As will be appreciated the amount D1 can differ from the amount D2, but to keep the transmitter frame size constant, D1=D2.

Figure 10D:
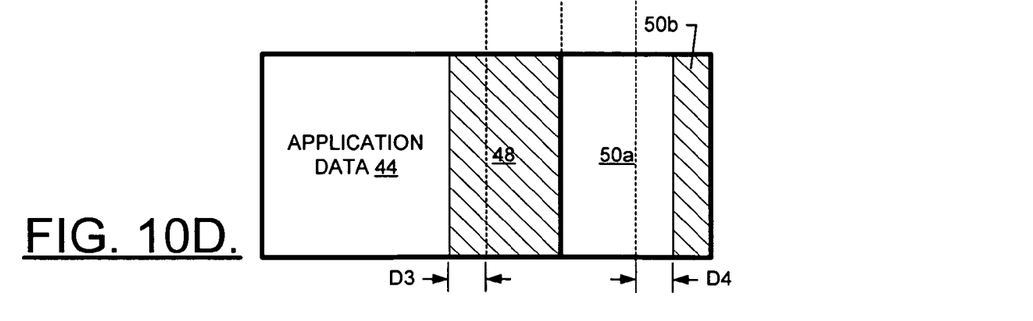

In yet another instance, shown in FIG. 10D and block 88 of FIG. 9, if the number of columns of padding is greater than the threshold number of columns of padding, thereby indicating the bit rate of incoming IP datagrams is below the threshold bit rate (e.g., typical bit rate), the encapsulator can be capable of puncturing only a portion, if any, of the spare columns of RS data 50b. In such an instance, at least a portion of the spare columns of RS data, as well as all of the base columns of RS data 50a, are left for encapsulation. Similar to FIG. 10C, as shown in FIG. 10D for example, the number of columns of padding may be more than the threshold number of columns by an amount represented by D3. In such an instance, the encapsulator can puncture a portion of the spare columns of RS data, the portion being an amount D4 less than the total number of spare columns of RS data. Also similar to before, the amount D3 can differ from the amount D4, but to keep the transmitter frame size constant, D3=D4.

As explained above, the number of columns of padding 48 that differ from the threshold number of columns of padding (D1 or D3) can equal the number of base columns of RS data 50a punctured (D2) or the number of columns of spare RS data 50b left for encapsulation (i.e., not punctured) (D4), to thereby keep the transfer frame size constant. It should be understood, however, that the encapsulator 28 can puncture more or less base columns of RS data, or more or less columns of spare RS data, without departing from the spirit and scope of the present invention. For example, the encapsulator can be restricted to limits within which the encapsulator can puncture the columns of RS data to thereby maintain the transfer frame size within predetermined limits. Additionally or alternatively, the encapsulator can determine a number of columns of RS data to puncture based upon a quality-of-service (QoS) level of coding the IP datagram.

As will be appreciated, the strength of coding the IP datagrams is directly related to the number of columns of RS data 50 encapsulated and thereafter broadcast with the encapsulated IP datagrams. The more RS data columns that are punctured, then, the weaker the coding becomes. In this regard, the QoS level of coding the IP datagrams can be defined as the number of errors that a terminal 10 can correct with respect to the overall number of columns in the MPE-FEC frame. To maintain a predefined QoS level, then, the encapsulator 28 can be capable of determining the number of RS data columns to puncture based upon the predefined QoS level and the number of columns of padding.

More particularly, in accordance with DVB, an MPE-FEC frame 54 typically includes n (e.g., 255) columns (i.e., total number of bytes per row including the application and RS data tables 46, 52 when each element of the frame includes a byte of data), with k (e.g., 191) application data columns and n–k (e.g., 64) columns of RS data 50. Including a number of columns of padding and a number of columns of punctured RS data, however, the MPE-FEC frame may include n–PA–PU columns, where PA and PU represent the number of columns of padding and punctured RS data, respectively. The relative error correcting capability of the terminal, or QoS level, then can be defined as follows: QoS=(n–k–PU)/(N–PA–PU). Rewriting the preceding equation, then, the number of columns of RS data to puncture can be determined as follows:

$$PU=(n-k-QoS\times(n-PA))/(1-QoS)$$

Irrespective of the number of columns of RS data 50 punctured, the encapsulator 28 can thereafter, as before, encapsulate the IP datagrams 44 and the remaining columns of RS data 50 in the application and RS data tables 46, 52, as shown in block 90 of FIG. 9 and as explained above. Then, the encapsulator can feed the encapsulated IP data streams along with PSI/SI tables to multiplexer 26 of the data broadcaster 16, which can function as before.

The encapsulator can continue to receive IP datagrams and coding and encapsulating the IP datagrams in the same manner explained above, including filling the application data table 46 of an MPE-FEC frame with application data (i.e., IP datagrams) and/or zero padding. In addition the encapsulator can continue to calculate RS data 50 for each row of the application data table, with the resulting RS parity bytes added to a corresponding row in the RS data table 52. Further, the encapsulator can continue to determine a number of columns of RS data to puncture, puncture those columns, and thereafter encapsulate the IP datagrams and the remaining RS data.

In instances where the encapsulator 28 determines the number of punctured columns of RS data 50 based upon a QoS level, as the encapsulator continues to receive, code and encapsulate IP datagrams, the encapsulator may be capable of adjusting the QoS level based upon a measured reception quality of the encapsulated data streams (i.e., MPE and MPE-FEC sections 56, 58). In this regard, as indicated above, the encapsulator can be capable of determining the number of RS data columns to be punctured based upon a predefined QoS level, where the QoS level is defined as the number of errors that a terminal 10 can correct with respect to the overall number of columns in the MPE-FEC frame 54, in accordance with FEC. As will be appreciated, however, such a measure of QoS may not account for the quality of the link over which the transport stream including the encapsulated data streams are broadcast to the terminals.

Thus, the system may further include one or more terminals 10 capable of operating as "field testers," which are capable of providing feedback to the encapsulator as to the reception quality of the encapsulated data streams. More particularly, the field tester terminal can be capable of receiving one or more encapsulated data streams. Thereafter, the field tester terminal can be capable of measuring the reception quality by counting the number of reception errors in the encapsulated data stream(s), the reception errors including transmission stream packet errors and/or CRC (cyclic redundancy check) errors on a section-by-section level. In this regard, by measuring the reception quality by counting the number of reception errors, the field tester terminal need not de-capsulate and decode the encapsulated data stream(s) in accordance with the FEC. Thus, if so desired, the field tester terminal, in contrast to a number of other terminals, need not include a decapsulator 42 (see FIG. 5). However, since field tester terminal does not de-capsulate and decode the encapsulated data, the field tester terminal may not have knowledge of the effective strength or weakness of the IP datagram coding applied by the encapsulator.

After measuring the reception quality of the encapsulated data stream(s), the terminal 10 operating as field tester can communicate, send, transmit or otherwise transfer the measured reception quality to the digital broadcaster 16, or more typically the encapsulator 28 of the digital broadcaster. The field tester terminal can transfer the measured reception quality to the encapsulator in any of a number of different manners. In one embodiment, for example, the field tester terminal transfers the measured reception quality to the encapsulator across one or more cellular networks 21 in accordance with a cellular communication technique such as GPRS (general packet radio service). Alternatively, the field tester terminal can transfer the measured reception quality to an encapsulator manager (not shown) via a cellular network. The encapsulator manager, in turn, can transfer the measured reception quality to the encapsulator, such as across an IP network like the Internet.

Upon receipt of the measured reception quality, the encapsulator 28 can determine if the measured reception quality is above a threshold acceptable level of quality for the broadcast of the encapsulated data stream(s). If the more particularly, the encapsulator can compare the measured number of reception errors with a number of reception errors associated with the predefined QoS level. In this regard, a plurality of QoS levels can be defined to include associated numbers of reception errors expected to be received when the number of punctured columns of RS data 50 is determined to maintain the respective QoS levels. The number of reception errors can be associated with the QoS levels in any of a number of different manners, such as based upon a relationship between QoS levels and reception errors, historical data, statistical analysis or the like.

Based upon a comparison of the measured reception errors and the reception errors associated with the predefined QoS level, the encapsulator 28 can determine if the measured number of reception errors is above the number of reception errors associated with the predefined QoS level. If the measured number of reception errors is above the number of reception errors associated with the predefined QoS level, the encapsulator can increase the predefined QoS level to a level associated with a number of reception errors below the measured number of reception errors. On the other hand, if the measured number of reception errors is below (i.e., not above) the number of reception errors associated with the predefined QoS level, the encapsulator need not increase the predefined QoS level since the measured reception quality is at or above the threshold acceptable level of quality for the broadcast of the encapsulated data stream(s).

As will be appreciated, the QoS level can be increased by increasing the number of columns of padding 48, and/or decreasing the number of punctured columns of RS data 50. Thus, after increasing the predefined QoS level, the number of punctured columns of RS data can decrease in accordance with the expression for the number of punctured columns of RS data, i.e., PU=(n−k−QoS×(n−PA))/(1−QoS). Additionally or alternatively, rewriting the preceding expression and given a number of punctured columns of RS data (e.g., number of punctured columns of RS data from the previous QoS level), the encapsulator 28 can determine an increased number of columns of padding in accordance with the following: PA=(QoS×(n−PU)+k−n+PU)/QoS. By decreasing the number of punctured columns of RS data and/or increasing the number of columns of padding, then, the encapsulator can increase the QoS level to the level associated with a number of reception errors below the measured number of reception errors. As will be appreciated, however, if the encapsulator increases the QoS level by increasing the number of columns of padding, the coding rate of the encapsulator may decrease since fewer columns of application data (i.e., IP datagrams) may fit in the MPE-FEC frame 54.

As explained above, the QoS level can be defined as the number of errors that a terminal 10 can correct with respect to the overall number of columns in the MPE-FEC frame 54. It should be appreciated that the QoS level can alternatively comprise any of a number of other measures representative of the quality-of-service of the digital broadcaster 16, including the encapsulator 28. For example, the QoS level can alternatively comprise the code rate (CR) of the encapsulator, which as similar to that given above, can be given by the expression, CR=k/n. Then, considering that the number of number of application data columns (k) and the number of columns (n) may be decreased by the number of columns of padding (PA) and number of punctured columns of RS data (PU), the alternative QoS level can be expressed as: QoS=(k−PA)/(n−PA−PU). In such instances, then, for a given QoS level and number of columns of padding 48, the number of punctured columns of RS data 50 can be determined as follows: PU=(QoS×(n−PA)−k+PA)/QoS. Similarly, for a given QoS level and number of punctured columns of RS data, the number of columns of padding can be determined as follows: PA=(k−QoS×(n'PU)/(1−QoS).

According to one aspect of the present invention, all or a portion of the system of the present invention, such as all or portions of the terminal 10, transmitter 14 and digital broadcaster 16, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 9 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowchart. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An encapsulator for encapsulating at least one data packet, the encapsulator comprising a processor configured to:

fit at least one data packet column-wise into an application data table part of an array, wherein the array also includes a coding data table part, wherein each table includes at least one column and at least one row;

fill at least one remaining column of the application data table with padding;

fit coding data row-wise into the coding data table of the array, the coding data having been calculated row-wise from corresponding rows of the application data table;

puncture at least one column of coding data based upon predefined criteria; and encapsulate the at least one data packet in the at least one column of the application data table, and any remaining column of coding data in the coding data table.

2. An encapsulator according to claim 1, wherein the processor is configured to puncture at least one column of coding data based upon a comparison of a number of columns of padding with a threshold number of columns of padding, the comparison of columns being representative of a comparison of a bit rate of incoming data packets and a threshold bit rate.

3. An encapsulator according to claim 2, wherein the coding data table includes a coding data table including at least one base column and at least one spare column, and wherein the processor is configured to compare the number of columns of padding and the threshold number of columns of padding, and thereafter puncture all of the spare columns of coding data when the number of columns of padding equals the threshold number of columns.

4. An encapsulator according to claim 3, wherein the processor is further configured to puncture at least one base column of coding data when the number of columns of padding is less than the threshold number of columns.

5. An encapsulator according to claim 4, wherein the processor is configured to puncture a number of base columns equal to a difference between the number of columns of padding and the threshold number of columns of padding.

6. An encapsulator according to claim 3, wherein the processor is configured to puncture at least one column of coding data by puncturing less than all of the spare columns of coding data when the number of columns of padding is greater than the threshold number of columns.

7. An encapsulator according to claim 6, wherein the processor is configured to puncture all of the spare columns less a number of spare columns equal to a difference between the number of columns of padding and the threshold number of columns of padding.

8. An encapsulator according to claim 1, wherein the processor is configured to determine a number of columns of coding data to puncture based upon a predefined quality-of-service (QoS) level and a number of the at least one column of padding, and thereafter puncture the determined number of columns of coding data, the QoS level being representative of a relative error correcting capability.

9. An encapsulator according to claim 8, wherein the processor is further configured to receive a measure of a reception quality of the encapsulated at least one data packet and at least one remaining column of coding data, and thereafter adjust the predefined QoS level based upon the measure of the reception quality.

10. An encapsulator according to claim 9, wherein the processor is configured to adjust the predefined QoS level by increasing the predefined QoS level if the measure of the reception quality is below a threshold acceptable level of quality.

11. An encapsulator according to claim 10, wherein the processor is configured to compare the measure of the reception quality and a reception quality associated with the predefined QoS level, and thereafter increase the predefined QoS level if, based upon the comparison, the measure of the reception quality is below the reception quality associated with the predefined QoS level, the QoS level being increased to a level associated with a reception quality at least as high as the threshold acceptable level of quality.

12. An encapsulator according to claim 9, wherein the processor is configured to receive a measure of a reception quality comprising a number of reception errors.

13. A method of encapsulating at least one data packet, the method comprising:
  fitting at least one data packet column-wise into an application data table part of an array, wherein the array also includes a coding data table part, wherein each table includes at least one column and at least one row;
  filling at least one remaining column of the application data table with padding;
  fitting coding data row-wise into the coding data table of the array, the coding data having been calculated row-wise from corresponding rows of the application data table;
  puncturing at least one column of coding data based upon predefined criteria; and
  encapsulating the at least one data packet in the at least one column of the application data table, and any remaining column of coding data in the coding data table.

14. A method according to claim 13, wherein puncturing at least one column of coding data comprises puncturing at least one column of coding data based upon a comparison of a number of columns of padding with a threshold number of columns of padding, the comparison of columns being representative of a comparison of a bit rate of incoming data packets and a threshold bit rate.

15. A method according to claim 14, wherein the coding data table includes a coding data table including at least one base column and at least one spare column, and wherein puncturing at least one column of coding data comprises:
  comparing the number of columns of padding and the threshold number of columns of padding; and
  puncturing all of the spare columns of coding data when the number of columns of padding equals the threshold number of columns.

16. A method according to claim 15, wherein puncturing all of the spare columns of coding data further comprises puncturing at least one base column of coding data when the number of columns of padding is less than the threshold number of columns.

17. A method according to claim 16, wherein puncturing at least one base column comprises puncturing a number of base columns equal to a difference between the number of columns of padding and the threshold number of columns of padding.

18. A method according to claim 15, wherein puncturing all of the spare columns of coding data comprises puncturing less than all of the spare columns of coding data when the number of columns of padding is greater than the threshold number of columns.

19. A method according to claim 18, wherein puncturing less than all of the spare columns comprises puncturing all of the spare columns less a number of spare columns equal to a difference between the number of columns of padding and the threshold number of columns of padding.

20. A method according to claim 13, wherein puncturing at least one column of coding data comprises:
  determining a number of columns of coding data to puncture based upon a predefined quality-of-service (QoS) level and a number of the at least one column of padding, the QoS level being representative of a relative error correcting capability; and
  puncturing the determined number of columns of coding data.

21. A method according to claim 20 further comprising:
  receiving a measure of a reception quality of the encapsulated at least one data packet and at least one remaining column of coding data; and
  adjusting the predefined QoS level based upon the measure of the reception quality.

22. A method according to claim 21, wherein adjusting the predefined QoS level comprises increasing the predefined QoS level if the measure of the reception quality is below a threshold acceptable level of quality.

23. A method according to claim 22, wherein increasing the predefined QoS level comprises:
  comparing the measure of the reception quality and a reception quality associated with the predefined QoS level;
  increasing the predefined QoS level if, based upon the comparison, the measure of the reception quality is below the reception quality associated with the predefined QoS level, the QoS level being increased to a level associated with a reception quality at least as high as the threshold acceptable level of quality.

24. A method according to claim 21, wherein receiving a measure of a reception quality comprises receiving a number of reception errors, the number of reception errors being representative of the reception quality.

25. A system comprising:
  a digital broadcaster configured to broadcast at least one encapsulated data stream, wherein the digital broadcaster comprises an encapsulator configured to encapsulate at least one data packet into the at least one encapsulated data stream; and
  at least one terminal configured to operate as a field tester to measure a reception quality of the broadcast at least one encapsulated data stream, wherein the encapsulator is configured to encapsulate at least one subsequent data packet into at least one subsequent data stream based upon the measured reception quality, the digital broadcaster being configured to broadcast the at least one subsequent data stream.

26. A system according to claim 25, wherein the encapsulator is configured to fit at least one data packet column-wise into an application data table part of an array, wherein the array also includes a coding data table part, wherein each table includes at least one column and at least one row, wherein the encapsulator is configured to fill at least one remaining column of the application data table with padding, wherein the encapsulator is also configured to fit coding data row-wise into the coding data table of the array, the coding data having been calculated row-wise from corresponding rows of the application data table, wherein the encapsulator is additionally configured to determine a number of columns of coding data to puncture based upon the measured reception quality, and thereafter puncture the determined at least one column of coding data, and wherein the encapsulator is further configured to encapsulate the at least one data packet in the at least one column of the application data table, and any remaining column of coding data in the coding data table.

27. A system according to claim 26, wherein the encapsulator is configured to determine a number of columns of coding data to puncture based upon a predefined quality-of-service (QoS) level and a number of the at least one column of padding, the QoS level being associated with measured reception quality and representative of a relative error correcting capability.

28. A system according to claim 27, wherein the encapsulator is further configured to adjust the predefined QoS level based upon the measured reception quality.

29. A system according to claim 28, wherein the encapsulator is configured to adjust the predefined QoS level by increasing the predefined QoS level if the measured reception quality is below a threshold acceptable level of quality.

30. A system according to claim 29, wherein the encapsulator is configured to compare the measured reception quality and a reception quality associated with the predefined QoS level, and thereafter increase the predefined QoS level if, based upon the comparison, the measured reception quality is below the reception quality associated with the predefined QoS level, the QoS level being increased to a level associated with a reception quality at least as high as the threshold acceptable level of quality.

31. A system according to claim 25, wherein the at least one terminal is configured to measure a reception quality comprising a number of reception errors.

32. A computer program product for encapsulating at least one data packet, the computer program product comprising at least one computer-readable storage medium having computer-readable program code portions stored therein, the computer-readable program code portions comprising:

a first executable portion for fitting at least one data packet column-wise into an application data table part of an array, wherein the array also includes a coding data table part, wherein each table includes at least one column and at least one row;

a second executable portion for filling at least one remaining column of the application data table with padding;

a third executable portion for fitting coding data row-wise into the coding data table of the array, the coding data having been calculated row-wise from corresponding rows of the application data table;

a fourth executable portion for puncturing at least one column of coding data based upon predefined criteria; and a fifth executable portion for encapsulating the at least one data packet in the at least one column of the application data table, and any remaining column of coding data in the coding data table.

33. A computer program product according to claim 32, wherein the fourth executable portion is adapted to puncture at least one column of coding data based upon a comparison of a number of columns of padding with a threshold number of columns of padding, the comparison of columns being representative of a comparison of a bit rate of incoming data packets and a threshold bit rate.

34. A computer program product according to claim 33, wherein the coding data table includes a coding data table including at least one base column and at least one spare column, and wherein the fourth executable portion is adapted to compare the number of columns of padding with the threshold number of columns of padding, and thereafter puncture all of the spare columns of coding data when the number of columns of padding equals the threshold number of columns.

35. A computer program product according to claim 34, wherein the fourth executable portion is further adapted to puncture at least one base column of coding data when the number of columns of padding is less than the threshold number of columns.

36. A computer program product according to claim 35, wherein the fourth executable portion is adapted to puncture a number of base columns equal to a difference between the number of columns of padding and the threshold number of columns of padding.

37. A computer program product according to claim 34, wherein the fourth executable portion is adapted to puncture less than all of the spare columns of coding data when the number of columns of padding is greater than the threshold number of columns.

38. A computer program product according to claim 37, wherein the fourth executable portion is adapted to puncture all of the spare columns less a number of spare columns equal to a difference between the number of columns of padding and the threshold number of columns of padding.

39. A computer program product according to claim 32, wherein the fourth executable portion is adapted to determine a number of columns of coding data to puncture based upon a predefined quality-of-service (QoS) level and a number of the at least one column of padding, and thereafter puncture the determined number of columns of coding data, the QoS level being representative of a relative error correcting capability.

40. A computer program product according to claim 39 further comprising:

a sixth executable portion for receiving a measure of a reception quality of the encapsulated at least one data packet and at least one remaining column of coding data; and a seventh executable portion for adjusting the predefined QoS level based upon the measure of the reception quality.

41. A computer program product according to claim 40, wherein the seventh executable portion is adapted to increase the predefined QoS level if the measure of the reception quality is below a threshold acceptable level of quality.

42. A computer program product according to claim 41, wherein the seventh executable portion is adapted to compare the measure of the reception quality with a reception quality associated with the predefined QoS level, and thereafter increase the predefined QoS level if, based upon the comparison, the measure of the reception quality is below the reception quality associated with the predefined QoS level, the QoS level being increased to a level associated with a reception quality at least as high as the threshold acceptable level of quality.

43. A computer program product according to claim 40, wherein the sixth executable portion is adapted to receive a measure of a reception quality comprising a number of reception errors.

* * * * *